United States Patent
Moore et al.

(10) Patent No.: US 7,010,156 B1
(45) Date of Patent: Mar. 7, 2006

(54) APPARATUS AND METHODS FOR POSITIONING A DOCUMENT AGAINST A READ HEAD IN A DOCUMENT PROCESSING SYSTEM

(75) Inventors: Michael J. Moore, Beverly Hills, MI (US); Joe M. Gagnier, Birmingham, MI (US)

(73) Assignee: Unisys Corporation, Blue Bell, PA (US)

( * ) Notice: Subject to any disclaimer, the term of this patent is extended or adjusted under 35 U.S.C. 154(b) by 825 days.

(21) Appl. No.: 09/908,021

(22) Filed: Jul. 18, 2001

(51) Int. Cl.
*G06K 9/00* (2006.01)
*G06K 5/00* (2006.01)

(52) U.S. Cl. ...................................... 382/139; 235/380
(58) Field of Classification Search ................ 382/135, 382/137, 138, 139, 140, 312, 321; 235/380, 235/448, 449, 58 CW; 271/258.01, 274; 360/2, 73.01
See application file for complete search history.

(56) References Cited

U.S. PATENT DOCUMENTS

| | | | |
|---|---|---|---|
| 3,734,491 A * | 5/1973 | Beery et al. | 271/274 |
| 4,031,359 A * | 6/1977 | Christou et al. | 235/449 |
| 4,107,653 A | 8/1978 | Kruklitis | 382/320 |
| 4,764,976 A * | 8/1988 | Kallin et al. | 382/321 |
| 4,851,655 A * | 7/1989 | Stone et al. | 235/58 CW |
| 5,054,092 A | 10/1991 | LaCaze | 382/139 |
| 5,895,904 A * | 4/1999 | Nissim | 235/380 |
| 6,466,384 B1 * | 10/2002 | Myers et al. | 360/2 |

\* cited by examiner

*Primary Examiner*—Kanjibhai Patel
(74) *Attorney, Agent, or Firm*—Lise A. Rode; Mark T. Starr; Brooks & Kushman P.

(57) ABSTRACT

Apparatus and methods are described for controlling the positioning of a document relative to a read head in a document processing system. A pressure applying element urges the document against the read head. A speed measuring element rotated by the pressure applying element transmits, to the processing system for use in processing the document, data describing document speed sensed by the pressure applying element at the read head. Distance is eliminated between the read head and speed sensing element, thus eliminating or reducing speed feedback data inaccuracies. Because pressure is applied to the document directly at the read head, read error rates are further reduced.

21 Claims, 2 Drawing Sheets

APPARATUS AND METHODS FOR POSITIONING A DOCUMENT AGAINST A READ HEAD IN A DOCUMENT PROCESSING SYSTEM

FIELD OF THE INVENTION

The present invention relates generally to document processing systems and, more particularly, to an apparatus for positioning a document against a magnetic ink character recognition (MICR) read head in a document processing system.

BACKGROUND OF THE INVENTION

Document processing systems commonly utilize technologies such as optical scanning and magnetic ink character recognition (MICR) to automatically read and process bank checks and other documents. As a document is processed through a system utilizing MICR, presentation of the document to a magnetic read head must be tightly controlled in order to prevent read errors. One factor affecting the rate of read errors is the speed of the document as it translates in front of the magnetic read head. Document processing systems commonly have sensing devices for measuring the speed of the moving document. The speed measurements are fed back to the processing system, which uses the data to perform processing functions, for example, to control positioning of the document at the read head.

Speed sensing devices typically are located away from the read head to avoid interference with the moving document or document drive apparatus. The processing system adjusts speed measurements to account for the distance between the speed sensor and the read head. However, as the document is moved along the processing path, it is subjected to a variety of forces that can render such adjustments inaccurate. For example, when the document is placed vertically on edge for processing, it can curl and buckle. Another source of inaccuracy can be a drive roller or drive wheel that pushes against the document surface at a location distant from the read head.

MICR read error rates also are affected by the extent to which the document contacts the read head while being read. Devices commonly are used to apply pressure to the moving document to urge it against the read head. The effectiveness of such pressure diminishes, however, with increasing distance from the read head.

Accordingly, there remains a need in the art for accurate measurements of the speed of a document as it is being read, so that speed feedback to the system can be used more effectively in document processing. It also would be desirable to apply pressure to the moving document as close to the read head as possible, and, in certain applications, to drive the document across the read head from a location as close to the read head as possible.

SUMMARY OF THE INVENTION

In one preferred form, the present invention provides an apparatus adapted for use in a document processing system to control the positioning of a document for reading by a MICR read head. The processing system processes the document using data describing the speed of the document. The apparatus includes a pressure applying element configured to urge the document against the read head, and a speed measuring element configured to be rotated by the pressure applying element and to transmit, to the processing system, data describing the speed of the document sensed by the pressure applying element at the read head.

The speed measuring and pressure applying elements are mounted on an axle upon which also are mounted one or more drive rollers for driving the document past the read head. The speed measuring and pressure applying elements rotate independently of the drive rollers. In another preferred form, the speed measuring and pressure applying elements are configured to rotate together with one or more drive rollers, and the pressure applying element thus participates in driving the document past the read head.

In the above embodiments, speed sensing and pressure application are integrated into a single apparatus that operates directly at the read head, along the same vertical axis as the drive rollers. Since distance is eliminated between the read head and the speed sensor, speed feedback data inaccuracies are eliminated or reduced. Because pressure is applied to the document directly at the read head, the document is urged more effectively against the read head, and read error rates are further reduced.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiments is merely exemplary in nature and is in no way intended to limit the invention, its application, or uses.

Figure 1:
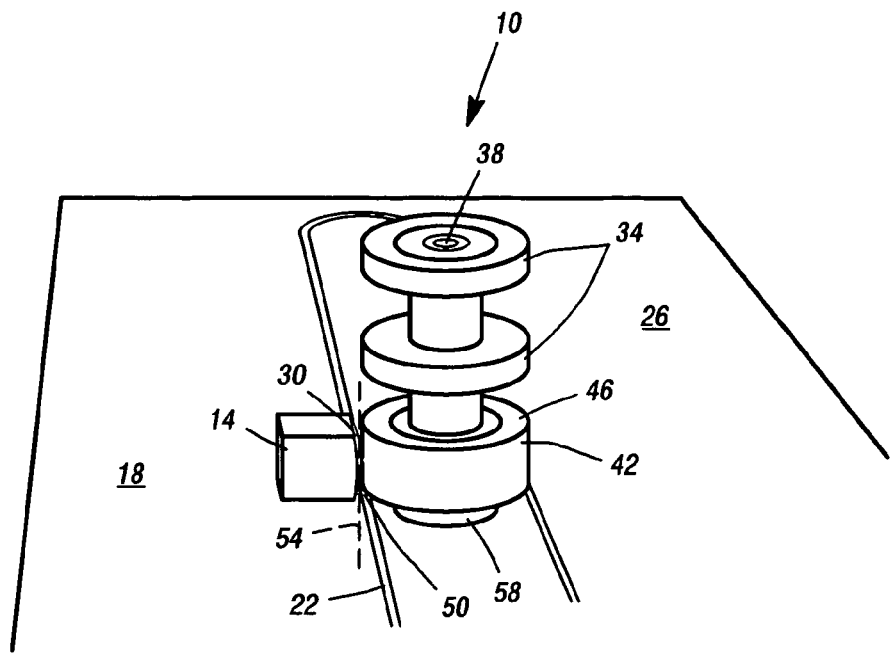
FIG. 1 is a top perspective view of an apparatus for controlling the positioning of a document against a MICR read head.

A preferred embodiment of an apparatus for controlling the positioning of a document against a read head in a document processing system is indicated generally by reference number 10 in FIG. 1. Although the present embodiment is tailored to a magnetic ink character recognition application, the apparatus 10 can be adapted for use in processing systems that employ other types of read heads, for example, optical imaging devices. As shown in FIG. 1, the apparatus 10 is adapted for use in a document processing system that utilizes a MICR read head 14 to read magnetic characters imprinted along an edge of a document (not shown in FIG. 1) as the document is moved against the read head 14. The apparatus 10 includes a horizontal base plate 18 upon which the MICR read head 14 is affixed. A track 22 in the upper surface 26 of the base plate 18 is configured to guide the lower edge of a vertically oriented document across a face 30 of the read head 14 as the document is moved along the track 22 as further described below.

Two drive rollers 34 are rigidly and coaxially mounted on a vertical axle 38 that extends downwardly through the base plate 18. Also mounted around the axle 38 is a cylindrical pressure member 42 having an outer ring 46 fabricated of foam or other similarly resilient material. The outer surface 50 of the foam ring 46 is aligned opposite the face 30 of the read head 14 such that, when a document (not shown in FIG. 1) is moved along the track 22 between the foam ring 46 and the read head face 30, the foam 46 presses the lower edge of the document into and against the vertical centerline 54 of the read head face 30. Although mounted coaxially with the drive rollers 34, the pressure member 42 rotates around the axle 38 independently of the drive rollers 34. More specifically, the pressure member 42 is rigidly mounted on a cylinder 58 that extends downwardly around the axle 38 through the base plate 18. The cylinder 58 is rotatably mounted around the axle 38 via appropriate bearings (not shown in FIG. 1).

Figure 2:
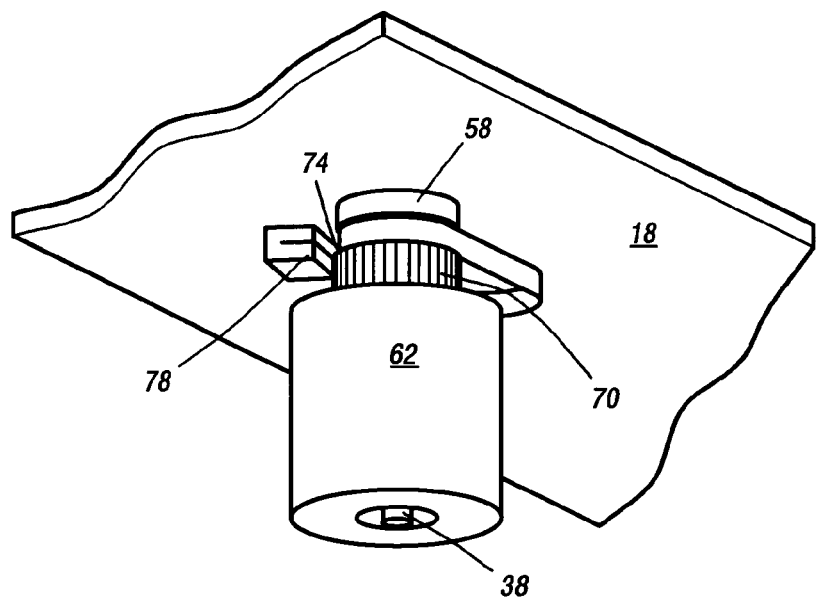
FIG. 2 is a bottom perspective view of the apparatus.

FIG. 2 is a bottom perspective view of the apparatus 10. The bottom portion of the axle 38 extends downwardly through the cylinder 58 and the base plate 18 and is mounted in a counterweight 62. A motor-driven pulley (not shown in FIG. 2) and associated gear(s) 70 are configured to drive the axle 38. A code wheel 74 is rigidly mounted coaxially around the cylinder 58 and thus can rotate around the axle 38 together with the cylinder 58 and the pressure member 42 (shown in FIG. 1). An optical sensor 78 adjacent the code wheel 74 is configured to detect optical signals generated by the rotating code wheel 74 and to transmit the signals to the document processing system.

Figure 3:
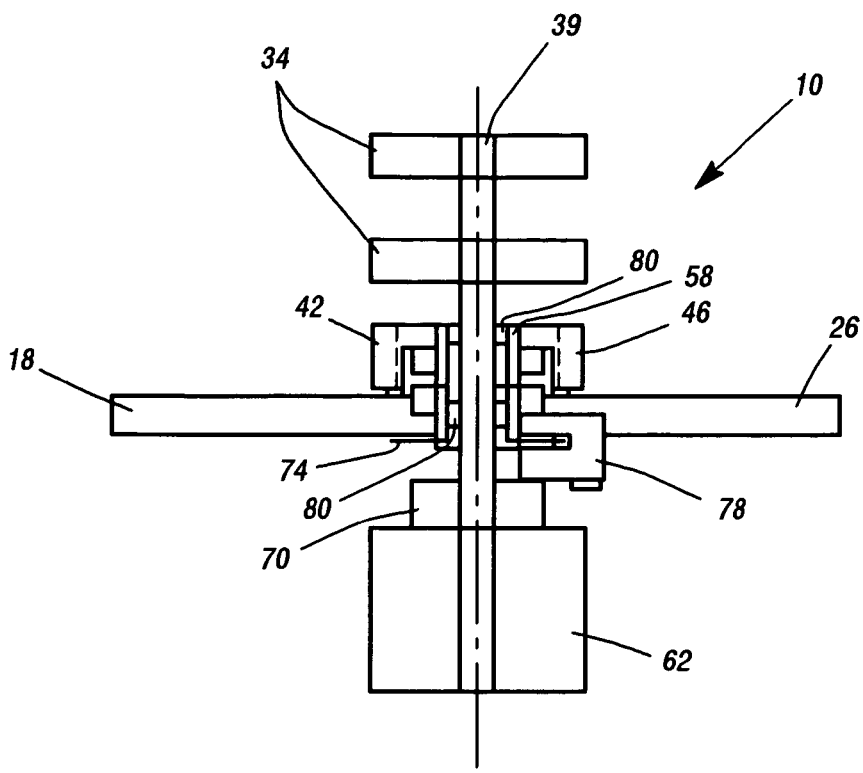
FIG. 3 is a side view of the apparatus.

A side view of the apparatus 10 is shown in FIG. 3. The cylinder 58 is mounted on the axle 38 via bearings 80. Although the drive rollers 34, pressure member 42 and code wheel 74 all are mounted coaxially on the axle 38, the pressure member 42 and code wheel 74 are mounted on the cylinder 58 and thus rotate together about the axle 38 independently of the drive rollers 34. In another preferred embodiment, the pressure member 42 and code wheel 74 are rigidly affixed to the axle 38 and thus are configured to rotate together with one or more drive rollers 34 about the axle 38. In yet another embodiment, the pressure member 42 is used in place of the drive roller(s) 34 to drive the document past the read head 14 (not shown in FIG. 3).

Figure 4:
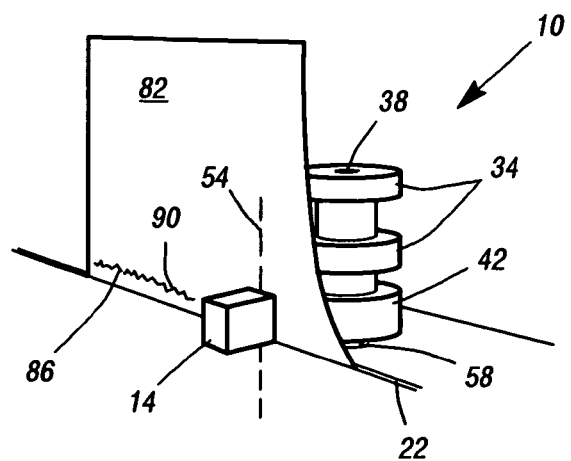
FIG. 4 is a top perspective view of the apparatus in operation.

In operation, the apparatus 10 positions a document relative to the read head 14 as shown in FIG. 4. A document 82 having an edge 86 along which magnetic ink characters 90 have been imprinted is placed in the track 22. The drive rollers 34, which are powered by the drive motor (not shown), drive the document 82 between the face 30 (not shown in FIG. 4) of the read head 14 and the pressure member 42. The pressure member 42 presses the bottom edge 86 of the moving document 82 into and against the read head face 30 at its vertical centerline 54. The moving document 82 drives the pressure member 42 to rotate about the axle 38. The rotating pressure member 42, via the cylinder 58, drives the code wheel 74 (not shown in FIG. 4) to rotate about the axle 38. The optical sensor 78 (not shown in FIG. 4) senses the optical signal generated by the rotating code wheel 74. This timing signal describes the instantaneous speed of the document 82 at the read head 14, sensed at the read head 14. The timing information is fed back to the document processing system for use, for example, in making adjustments to the positioning of the moving document 82.

When used in processing systems using drive rollers to move documents past the MICR reader, the pressure device can be free-wheeled, that is, rotated independently of the central axle 38, as previously described, to reduce the effects of drive roller drag or pull on speed feedback data. In embodiments in which the pressure member 42 and code wheel 74 are affixed to and rotate with the axle 38, the pressure member 42 drives the document 82 into, against and past the read head 14. Thus it is contemplated that the pressure member 42 can be used to supplement or replace the drive roller(s) 34 and to drive the document 82 across the vertical centerline 54 of the read head face 30.

The above-described apparatus senses the speed of a moving document and applies pressure to the document at the same location, that is, directly across from the MICR read head. Because the distance between speed sensing and the read head is eliminated, speed feedback inaccuracies are reduced or eliminated. Read error rates are further reduced because the portion of the document surface to be read is urged directly against the read head.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus adapted for use in a document processing system to control the positioning of a document for readying by a read head, the processing system configured to process the document using data describing the speed of the document during reading, the apparatus comprising:
   a pressure applying element configured to urge the document against the read head; and
   a speed measuring element configured to be rotated by the pressure applying element and to transmit, to the processing system, data describing the speed of the document sensed by the pressure applying element at the read head.

2. The apparatus of claim 1 wherein the speed measuring and pressure applying elements rotate about the same axis about which also rotates at least one drive element for driving the document past the read head.

3. The apparatus of claim 2 wherein the speed measuring and pressure applying elements rotate independently of the at least one drive element.

4. The apparatus of claim 2 wherein the speed measuring and pressure applying elements rotate with the at least one drive element.

5. The apparatus of claim 1 wherein the pressure applying element is rotated by the moving document.

6. In combination with a document processing system configured to read a document using a read head across which the document is moved while it is read, the document processing system further configured to process the document using data describing the speed of the moving document, a speed sensing element configured to rotate while in contact with the moving document at the read head and thereby to transmit data describing the document speed to the processing system.

7. The combination of claim 6 wherein the speed sensing element comprises a pressure applying element that presses the document at and against the read head while the document is moved across the read head.

8. The combination of claim 7 wherein the pressure applying element is further configured to drive the document across the read head.

9. The combination of claim 7 wherein the pressure applying element is further configured to be driven by the document moving across the read head.

10. The combination of claim 7 wherein the pressure applying element is further configured to drive the speed sensing element.

11. The combination of claim 6 wherein the speed sensing element is further configured to drive the document across the read head while sensing, at the read head, the movement of the document.

12. The combination of claim 6 wherein the speed sensing element is further configured to be driven by the document moving across the read head while the speed sensing element senses, at the read head, the movement of the document.

13. In combination with a document processing system configured to read a document using a read head across which the document is moved while it is read and further configured to utilize data describing the speed of the moving document to control positioning of the moving document, a rotating pressure applying element that presses the document at an against the read head while driving the document across the read head, the pressure applying element further configured to sense, at the read head, the speed of the document and to transmit data describing the speed to the processing system.

14. In combination with a document processing system configured to read a document using a read head across which the document is moved while it is read, the document processing system further configured to process the document using data describing the speed of the moving document, a pressure applying element that presses the document at and against the read head, the pressure applying element further configured to sense the speed of the document at the read head and to transmit data describing the speed to the processing system.

15. The combination of claim 14 wherein the pressure applying element drives the document across the read head.

16. The combination of claim 14 wherein the pressure applying element is driven by the document moving across the read head.

17. A method for positioning a document for reading by a magnetic read head of a document processing system, the document imprinted along an edge with magnetic ink characters, the method comprising the steps of:

pressing the imprinted document edge against the read head as the document is moved past the read head;

sensing the speed of the moving document; and transmitting data describing the document speed to the processing system for use in controlling the movement of the document, wherein the sensing step is performed at the read head.

18. The method of claim 17 wherein the pressing and sensing steps are performed simultaneously at the read head using a single pressing and sensing element.

19. The method of claim 17 further comprising the step of driving the document past the read head.

20. The method of claim 19 wherein the pressing, sensing and driving steps are performed simultaneously at the read head using a single pressing, sensing and driving element.

21. The method of claim 19 wherein the sensing and driving steps are performed simultaneously at the read head using a single sensing and driving element.

\* \* \* \* \*